United States Patent [19]

King

[11] Patent Number: 4,724,442

[45] Date of Patent: Feb. 9, 1988

[54] METHOD AND APPARATUS FOR LOOP DIRECTION FINDING WITH NO AMBIGUITY

[75] Inventor: Dennis D. King, Sandy, Utah

[73] Assignee: E-Systems, Inc., Dallas, Tex.

[21] Appl. No.: 868,248

[22] Filed: May 29, 1986

[51] Int. Cl.$^4$ .............................................. G01S 5/04
[52] U.S. Cl. ................................................ 342/434
[58] Field of Search .............. 342/351, 417, 419, 420, 342/423, 429, 432–434, 437, 443, 448, 424

[56] References Cited

U.S. PATENT DOCUMENTS

| | | | |
|---|---|---|---|
| 2,279,466 | 4/1942 | Johnske et al. | 342/430 |
| 2,368,921 | 2/1945 | Greene et al. | 342/423 |
| 2,388,262 | 11/1945 | Ganiayre et al. | 342/429 |
| 2,465,381 | 3/1949 | Libby | 342/430 |
| 2,475,975 | 7/1949 | McCarthy et al. | 342/419 |
| 2,513,485 | 7/1950 | Herrick | 455/144 |
| 2,975,418 | 3/1961 | Himmel | 342/429 |
| 3,005,200 | 10/1961 | O'Meara | 342/439 |
| 3,093,827 | 6/1963 | Travers | 342/420 |
| 3,701,155 | 10/1972 | Adams | 342/423 |
| 3,747,107 | 7/1973 | Poppe et al. | 342/417 |
| 3,754,266 | 8/1973 | Poppe et al. | 342/420 X |
| 3,774,216 | 11/1973 | Coleman et al. | 342/432 |
| 3,816,833 | 6/1974 | Ryan | 342/443 |
| 3,818,479 | 6/1974 | Ledbetter | 342/423 |
| 3,824,595 | 7/1974 | Hall | 342/432 |
| 3,916,411 | 10/1975 | Fiedler | 342/434 |
| 3,967,280 | 6/1976 | Mayer et al. | 342/434 |
| 4,003,060 | 1/1977 | Broce et al. | 342/419 |
| 4,121,216 | 10/1978 | Bunch et al. | 342/424 |
| 4,198,633 | 4/1980 | Krajewski | 342/437 |
| 4,307,402 | 12/1981 | Watanabe | 342/433 |
| 4,410,890 | 10/1983 | Davis et al. | 342/419 |
| 4,475,106 | 10/1984 | Andrews | 342/435 |
| 4,489,327 | 12/1984 | Eastwell | 342/432 |

OTHER PUBLICATIONS

Giacoletto et al., *Medium-Frequency Crossed-Loop Radio Direction Finder with Instantaneous Unidirectional Visual Presentation;* (RCA Labs; 9/49).

*Primary Examiner*—Theodore M. Blum
*Assistant Examiner*—Bernarr E. Gregory
*Attorney, Agent, or Firm*—Albert M. Crowder, Jr.

[57] ABSTRACT

A method and apparatus is provided for deriving the direction of a received signal from a signal source using first and second orthogonally-mounted loop antennas and an omnidirectional antenna. In operation, output signals from each of the antennas are generated and repeatedly supplied to signal processing circuitry in a cyclical fashion as the receiver is rotated to locate the transmitter. The amplitudes of the output signals from the first and second loop antennas are then compared to determine whether the signal source is located in a null of the second loop antenna. If so, a null indication signal is generated. The phases of the output signals from the second loop antenna and the omnidirectional antenna are compared to determine whether the received signal is being received in a predetermined region of the second loop antenna. If so, an ambiguity indication signal is generated. The null indication signal and the ambiguity indication signal are then logically combined to generate a visual output representing the direction of the signal source.

11 Claims, 1 Drawing Figure

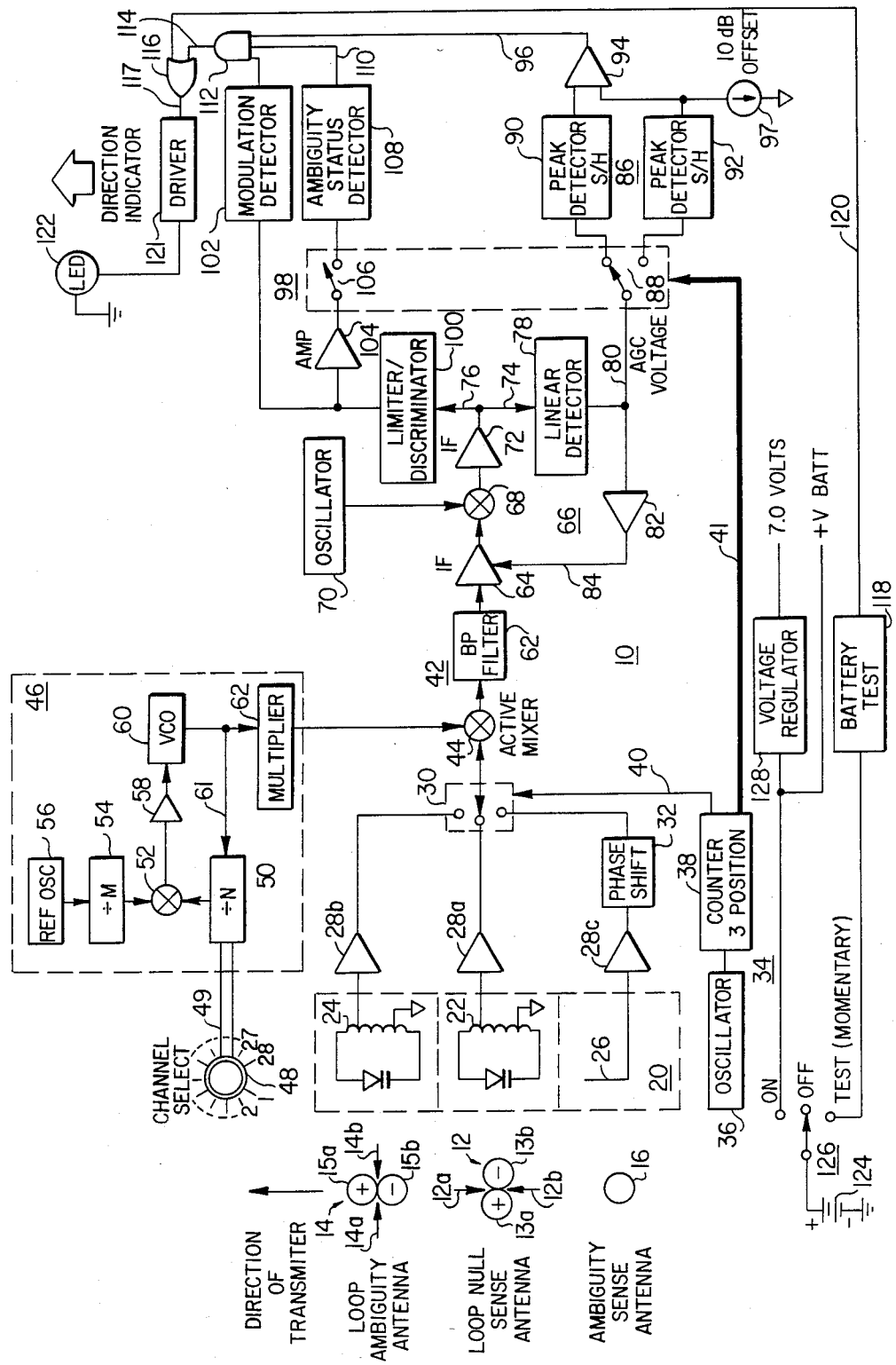

METHOD AND APPARATUS FOR LOOP DIRECTION FINDING WITH NO AMBIGUITY

The United States Government has rights in this invention pursuant to Contract No. DAAK20-83-C-0639 awarded by the Department of the Army.

TECHNICAL FIELD

The present invention relates generally to directional receivers and more particularly to a method and apparatus for deriving the direction of a remote radio frequency transmitting station with no ambiguity.

BACKGROUND OF THE INVENTION

Portable direction finding systems are well-known in the prior art. One such system consists of a loop antenna with a deployable whip attached to the side of the loop. To determine the direction of a transmitter, the whip is first deployed to produce a coarse cardioid-shaped antenna pattern. The strength of the received signal is monitored while the antenna is rotated to produce a maximum signal. This first step indicates the general direction of the transmitter. Thereafter, the whip is retracted and one of two sharp nulls of the loop antenna is then used to accurately determine the transmitter direction. Such portable direction finding systems require substantial operator training and several minutes of time for a proper determination of the transmitter direction.

It is also known in the prior art to locate the direction of a transmitter using a three antenna system including first and second orthogonally-mounted loop antennas in combination with a omnidirectional antenna. Such systems typically use the electrical summation of all the antenna outputs to create composite antenna patterns. These systems are therefore undesirable because they require precise control of antenna placement and precise matching of the antenna amplitude and phase characteristics. Such requirements increase the overall cost of the system while at the same time decreasing reliability due to antenna and signal processing component mismatch.

Accordingly, there is therefore a need for an improved method and apparatus for deriving the direction of a remote transmitter which overcomes these and other problems associated with prior art direction finding systems.

BRIEF SUMMARY OF THE INVENTION

According to the present invention, a method for deriving the direction of a received signal from a signal source uses a receiver having first and second orthogonally-mounted loop antennas in combination with an omnidirectional antenna. As the operator turns the receiver, output signals generated from each of the antennas are repeatedly processed in a cyclical fashion. Peak amplitudes of the output signals from the first and second loop antennas are compared to determine whether the signal source is located in a null of the first loop antenna. If so, a null indication signal is generated. Also, the phase of the output signals from the second loop antenna and the omnidirectional antenna are compared to determined if the received signal is being received in a predetermined region of the second loop antenna. If so, an ambiguity indication signal is generated. The null indication signal and the ambiguity indication signal are then combined logically to generate an output, e.g., a visual indicator or audible alarm, representing the direction of the signal source.

In the preferred embodiment, a receiver housing is provided for supporting the first and second loop antennas and the omnidirectional antenna, and for supporting the receiver processing circuitry used to generate the directional indication. In operation, RF outputs of the three antennas are amplified and applied to a three position electronic switch. The electronic switch is controlled by a clock and synchronization circuit to repeatedly feed one antenna signal at a time into a mixer of an IF processing stage as the receiver is rotated by the operator. The other mixer input is provided by a phase-locked loop-controlled frequency synthesizer. The antenna signal applied to the IF processing stage is then demodulated from RF to IF and processed by an automatic gain control (AGC) processing loop. The AGC loop generates a voltage proportional to the magnitude of the respective signal received from the first or second loop antenna. The IF signals from the second loop antenna and the omnidirectional antenna are also limited and applied to a FM discriminator for phase evaluation.

To generate the null indication signal, the clock and synchronization circuit connects the derived AGC voltages representing the signals from the first and second loop antennas to first and second peak detectors, respectively. The peak detectors determine the peak signal observed in each loop. The outputs from the first and second peak detectors are then compared to generate the null indication signal. Under the control of the clock/synchronization circuit, the output of the FM discriminator monitors the phase change between the second loop antenna and the omnidirectional antenna. The FM discriminator circuit drives an ambiguity status detector which produces an ambiguity indication signal when the received signal is being received in the predetermined region of the second loop antenna. When the null indication signal and the ambiguity indication signal are logically combined by an AND gate, a precise determination of transmitter location is enunciated. In operation, the operator simply rotates the receiver until an indicator is illuminated or an audible alarm is sounded, and the position of the front of the receiver then indicates the precise direction of the transmitter.

Because the individual outputs from the antennas are sequentially applied to the IF processing stage, accurate directional indications do not depend on precise control of antenna location or precise matching of the antenna and signal processing component characteristics.

BRIEF DESCRIPTION OF THE DRAWINGS

For a more complete understanding of the present invention and the advantages thereof, reference is now made to the following Description taken in conjunction with the accompanying Drawings in which:

The FIGURE is a schematic block diagram of the preferred receiver structure of the present invention for deriving the direction of a remote radio frequency transmitting station.

DETAILED DESCRIPTION

Referring now to the FIGURE, a detailed schematic diagram is shown of the preferred direction finding receiver 10 of the present invention. The receiver 10 is preferably supported in a small portable housing which is handheld or strapped to the operator's wrist or arm during operation. The receiver 10 includes first and second loop antennas 12 and 14 each exhibiting a "FIG.

8" pattern with two nulls. In particular, loop antenna 12 has nulls 12a and 12b located between its front pattern maximum 13a and its back pattern maximum 13b. Likewise, loop antenna 14 has nulls 14a and 14b located between its front pattern maximum 15a and its back pattern maximum 15b. The receiver 10 also includes an omnidirectional antenna 16, preferably a short whip, which exhibits a nearly circular pattern.

The first loop antenna 12, the so-called "null sense antenna," is mounted so that one of its nulls, e.g., null 12a, points toward the front of the receiver package. This position is indicated in the FIGURE for convenience as being in the same direction as the transmitter to be located. The second loop antenna 14, the "loop ambiguity antenna," is mounted orthogonal to the first loop antenna 12 such that its front pattern maximum 15a also points towards the front of the receiver package. The omnidirectional antenna 16, the so-called "ambiguity sense antenna," is mounted adjacent the first and second loop antennas 12 and 14.

As will be described, the receiver 10 processes the outputs of the antennas 12, 14 and 16 independently, and therefore the amplitude and phase characteristics of these antennas need not be carefully matched. Moreover, the precise location of the antennas is not critical as long as the first and second loop antennas are mounted orthogonally.

Referring back to the FIGURE, the receiver 10 includes an antenna interface circuit 20 which includes appropriate circuitry for interfacing the antennas 12, 14 and 16 with the remainder of the signal processing circuitry in the receiver 10. Specifically, antenna interface circuit 20 includes a first tuned circuit 22 responsive to the null sense antenna 12 for generating an output signal representing the reception of a signal from the transmitter to be located by the receiver 10. Likewise, a second tuned circuit 24 is responsive to the loop ambiguity antenna 14 for generating an output signal representing reception of the transmitter signal. The antenna interface circuit 20 also includes a whip sense antenna 26 responsive to the omnidirectional antenna 16 for generating an output signal. Interface circuit 20 includes RF low noise amplifiers 28a and 28b connected to the first tuned circuit 22 and the second tuned circuit 24, respectively, for interfacing the signals output from these antennas to a three-way electronic switch 30. As also seen in the FIGURE, the signal output from the sense antenna 26 is amplified by RF low noise amplifier 28c and applied to the electronic switch 30 through a phase shifter 32.

The receiver 10 also includes a clock and synchronization circuit 34 having an oscillator 36 and a three-position counter 38. The three-position counter 38 generates a first control signal on line 40 which is applied to the electronic switch 30. In particular, the first control signal controls the electronic switch 30 to repeatedly transmit the output of one of the antennas 12, 14 or 16 through the electronic switch 30 in a cyclical fashion as the receiver is rotated by the operator in search of the transmitter direction. Accordingly, when the electronic switch 30 is in its central position as shown in the FIGURE, the output of the null sense antenna 12 is connected through the electronic switch 30 to the next signal processing stage. Likewise, when the electronic switch is connected in its upper position, the output of the loop ambiguity antenna 14 is connected to the signal processing stage, and so forth. The clock and synchronization circuit 34 also generates a second control signal on bus 41 for the purposes to be described.

As the operator rotates the receiver 10, the electronic switch 30 repeatedly connects one of the antenna output signals to an IF processing stage 42. IF processing stage 42 includes a first mixer 44 having a first input for receiving the selected antenna output signal from the electronic switch 30, and a second input for receiving a reference signal from a frequency synthesizer designated generally by the reference numeral 46. The frequency synthesizer 46 expands the operational capabilities of the receiver 10 by providing a plurality of frequency-selectable channels. In this manner, the receiver 10 can be tuned to respond to one of a plurality of transmitters operating at different frequencies at different directional locations.

The frequency synthesizer 46 includes a channel select switch 48 mounted on the receiver housing. This switch generates a digital channel select signal on bus 49 which determines the selected channel of operation (i.e., the selected frequency of the transmitter of interest). The output of the channel select switch 48 is divided by a first divider 50 and applied to one input of a mixer 52. The other input to the mixer 52 is provided from the output of a divider 54 driven by a reference oscillator 56. The output of mixer 52 is applied to a loop filter 58 and then to a voltage-controlled oscillator (VC0) 60. The output of the VCO 60 is then applied to control the operation of the divider 50 via line 61. In operation, the setting of the divider 50 determines the frequency of the reference signal, and mixer 52, reference oscillator 56, loop filter 58 and VCO 60 operate as a phase-locked loop (PLL) to maintain this frequency constant. The output of the VCO 60 is also multiplied by multiplier 62 and applied to the mixer 44 of the IF processing stage 42.

The output of the mixer 44 in the IF processing stage 42 is filtered by a bandpass filter 62 of the stage and applied to a first IF amplifier 64. The gain of the first IF amplifier 64 is controlled by an automatic gain control (AGC) processing loop designated generally by the reference numeral 66. AGC loop 66 includes a mixer 68 which has a first input for receiving the output of the first IF amplifier 64, and a second input for receiving the output of a reference oscillator 70. The output of the mixer 68 is amplified by a second IF amplifier 72 in the AGC loop 66 to increase the peak-to-peak signal voltage. The signal output from the second IF amplifier 72 is then applied to two signal paths, 74 and 76.

Signal path 74 forms part of the AGC processing loop 66 and supplies the signal output from the second IF amplifier 72 to a linear detector 78. The linear detector 78 processes the signal received from the second IF amplifier 72 to generate an automatic gain control (AGC) voltage on line 80 representing the amplitude of the signal received from whichever antenna is connected to the IF processing stage 42 via the electronic switch 30. The AGC voltage is also supplied to an automatic gain control circuit 82, which serves to maintain the AGC voltage constant by controlling the amount of gain of the first IF amplifier 64 via a signal supplied over line 84.

The AGC voltage on line 80 is then supplied to a null signal generation circuit 86 through a switch 88 controlled by the clock and synchronization circuit 30. Specifically, the second control signal on bus 41 from the clock and synchronization circuit 30 controls the operation of the switch 88 to connect the AGC voltage(s), representing the signal amplitudes output from the null sense antenna 12 and the loop ambiguity antenna 14, to first and second peak detector sample-and-hold circuits 90 and 92 of the null signal generation circuit 86. Accordingly, when switch 88 is in its top position, as shown in the FIGURE, the AGC voltage representing the amplitude of the signal from the null sense antenna 12 is supplied to the first peak detector sample-and-hold circuit 90. Circuit 90 generates a signal representing the peak of the AGC voltage from the null sense antenna. This peak signal is then stored in the sample-and-hold circuit. Likewise, the AGC voltage from the loop ambiguity antenna 14 is supplied from the line 80 to the second peak detector sample-and-hold circuit 92 when the switch 88 is placed in its lower position. Circuit 92 then generates a peak signal which is again stored in the sample-and-hold circuit.

The signal samples from the peak detector sample-and-hold circuits 90 and 92 are then supplied to a comparator 94 which generates a logic high output on line 96 when the received signal lies in one of the two nulls 12a or 12b of the null sense antenna 12. Otherwise, the output of the comparator 94 on line 96 remains at a logic low state. The output of the peak detector sample-and-hold circuit 92 is provided with a 10 db offset (before comparison with the output of peak detector 90) by the current source 97.

Accordingly, a null sense indication is enabled (i.e., line 96 is pulled to a logic high state) whenever the received signal is in one of the two nulls of the null sense antenna 12. While the nulls produce a somewhat accurate directional indication, the existence of two nulls prevents the null sense indication alone from indicating transmitter direction. Accordingly, the receiver 10 includes an ambiguity signal generation circuit 98 which operates in conjunction with the null signal generation circuit 86 to resolve any ambiguity in the directional indication.

As seen in the FIGURE, the second signal path 76 connects the output of the second IF amplifier 72 to the ambiguity signal generation circuit 98. This signal is limited and discriminated by a limiter and discriminator 100, the output of which is supplied to a modulation detector 102 and to an amplifier 104. The discriminator portion of the limiter and discriminator 100 generates amplitude signals proportional to the phase of the signals input thereto. Amplifier 104 generates an output signal which is applied through a switch 106 to an ambiguity status detector 108. Switch 106 is controlled by the clock and synchronization circuit 30 to properly time sample the discriminator 100 output to determine the phase between the signals output from the loop ambiguity antenna 14 and the omnidirectional antenna 16.

If the transmitter is located in one of the nulls 12a or 12b of the null sense antenna 12, then it is also located in the front pattern maximum 15a of the loop ambiguity antenna 14 (by virtue of the orthogonal relationship of the loop antennas). The phase of the signal entering the front pattern maximum 15a of the loop ambiguity antenna 14 is 180° different from the phase entering the back pattern maximum 15b of this antenna. Meanwhile, the phase of the signal entering the omnidirectional antenna 16 is independent of direction. Accordingly, by comparing the phase of the loop ambiguity antenna 14 (i.e., the second loop antenna) with the phase of the omnidirectional antenna 16, a determination is made by the ambiguity status detector 108 whether the received signal is entering from the front pattern maximum 15a of the loop ambiguity antenna 14 or the back pattern maximum 15b. By convention, the phase difference is positive if the signal is entering the front pattern maximum 15b, and therefore the null being detected by the receiver 10 is the proper one. In this case, an ambiguity indication signal is generated by the ambiguity status detector 108 on line 110. This is preferably accomplished by pulling the line 110 to a logic high state.

The null indication signal on line 96, the ambiguity indication signal on line 110 and the output of the modulation detector 102 are then logically combined by AND gate 112, which in response thereto produces a logic high output on line 114. Modulation detector 102 ensures that the output of AND gate 112 is switched high only in response to a signal from the transmitter to be located. Line 114 also forms one input of an OR gate 116, the other input thereto supplied from a battery test circuit 118 via line 120. When the null indication signal and the ambiguity indication signal are at logic high levels, the output of the AND gate 112 is high and thereby the output of OR gate 116 is driven high. The OR gate output on line 117 in turn controls a driver circuit 121 to light an LED indicator 122. In operation, the user simply rotates the receiver 10 until the indicator 122 is illuminated. The position of the front of the receiver package in the FIGURE, and more particularly, the position of the front pattern maximum 15a of the loop ambiguity antenna 14, then indicates the precise direction of the transmitter. Once the receiver is rotated such that the received signal is not being received in the null 12a (or null 12b) of the null sense antenna 12, however, the LED 122 will go out.

As also seen in the FIGURE, the receiver 10 includes a battery 124, and a control switch 126 for connecting the battery through a voltage regulator 128 to the remainder of the processing circuitry and for connecting the battery 124 to the battery test circuit 118. When the switch 126 is in the "test" position, the OR gate 116 will generate a logic high output to light the indicator 122 if the battery voltage is within acceptable limits.

Accordingly, it can be seen that the present invention provides a unique method and apparatus to derive the direction of a remote radio frequency transmitting station or other signal source. As discussed above, a null sense indication is enabled when the received signal is in one of two nulls of a null sense antenna. An ambiguity indication is enabled when the received signal is coming from the general direction of the front of the receiver package. When the two indications are logically combined, a precise determination of the transmitter location is enunciated. The operator determines this location by simply rotating the receiver package until the indicator, or other suitable aural or visual alarm, is illuminated or sounded. The position of the receiver package (i.e., the position of the front pattern maximum 15a of the loop ambiguity antenna 16) then indicates the precise direction of the transmitter. The receiver 10 is implemented in a small package preferably strapped to the wrist or arm of the user. No operator adjustment and virtually no training is required. Moreover, the directional determination procedure takes only seconds.

It is also envisioned that the receiver circuitry can be used with antennas which are electrically or mechanically rotating, therefore producing a direct indication of transmitter direction referenced to magnetic north. Moreover, because the signal processing circuitry processes each antenna separately, the amplitude and phase characteristics of the antennas need not be carefully matched. Indeed, the amplitude matching between the loop antennas and the omnidirectional antennas can be coarse because the amplitude of the omnidirectional antenna signal is never used for determining direction.

Although the invention has been described and illustrated in detail, it is clearly understood the same is by way of illustration and example only as not to be taken by way of limitation. The spirit and scope of the present invention are to be limited only by the terms of the appended claims.

What is claimed is:

1. Apparatus for deriving the direction of a received signal from a signal source, comprising:
    first and second loop antennas orthogonally mounted with reference to each other and each having a pair of nulls and a front pattern maximum;
    an omnidirectional antenna mounted adjacent said first and second loop antennas;
    an interface circuit connected to said first and second orthogonally-mounted loop antennas and to said omnidirectional antenna for generating output signals from said loop and omnidirectional antennas representing reception of the received signal;
    IF processing means;
    a clock and synchronization circuit for generating first and second clock control signals;
    a first electronic switch responsive to the first clock control signal for cyclically connecting the output signals from said loop and omnidirectional antennas to said IF processing stage;
    an automatic gain control (AGC) processing loop connected to said IF processing means for generating amplitude signals from said first and second loop antennas;
    first and second peak detector sample-and-hold circuits;
    a second electronic switch responsive to the second clock control signal for selectively applying the amplitude signal from said first loop antenna to said first peak detector sample-and-hold circuit and for applying the amplitude signal from said second loop antenna to said second peak detector sample-and-hold circuit, the first and second peak detector sample-and-hold circuits for generating and storing peak values of the amplitude signals;
    a comparator for receiving the peak values of the amplitude signals and in response thereto generating a null indication signal when the signal source is located in a null of the first loop antenna;
    comparing the phase of the output signal from the second loop antenna with the output signal from the omnidirectional antenna and in response thereto generating an ambiguity indication signal when the signal source is located in the front pattern maximum of the second loop antenna;
    a logic gate for receiving the ambiguity indication signal and the null indication signal and in response thereto generating an output signal indicating that the signal source is located in the null of the first loop antenna and in the front pattern maximum of the second loop antenna; and
    an indicator responsive to the logic gate output signal to generate an output representing the direction of the signal source.

2. The apparatus for deriving the direction of a received signal from a signal source as described in claim 1, wherein said means for comparing the phase of the output signal from the second loop antenna with the output signal from the omnidirectional antenna comprises:
    a limiter and discriminator circuit for receiving the output signals and in response thereto generating phase signals proportional thereto;
    an ambiguity status detector; and
    a second electronic switch responsive to the second clock control signal for selectively connecting the phase signals from the limiter and discriminator circuit to the ambiguity status detector to thereby generate the ambiguity indication signal.

3. The apparatus for deriving the direction of a received signal from a signal source as described in claim 1 wherein said indicator responsive to the logic gate output signal is a light emitting diode (LED).

4. The apparatus for deriving the direction of a received signal from a signal source as described in claim 1 further including a phase locked loop (PLL) frequency synthesizer connected to the IF processing means for enabling the apparatus to selectively derive the direction of a received signal from a plurality of signal sources.

5. Apparatus for deriving the direction of a received signal from a signal source, comprising:
    a loop null antenna responsive to the received signal and having a signal pattern with two juxtapositioned nulls;
    a loop ambiguity antenna orthogonally-mounted with respect to said loop null antenna, said loop ambiguity antenna responsive to the received signal and having a signal pattern with front and back maxima;
    an omnidirectional antenna mounted adjacent said null and ambiguity loop antennas;
    means for generating output signals from said null and ambiguity loop antennas and from said omnidirectional antenna, the output signals representing reception of the received signal;
    a clock and synchronization circuit for generating first and second clock control signals;
    switch means responsive to the first clock control signal for cyclically connecting the output signals for processing;
    a mixer for receiving the output signals from said switch means and for receiving a reference signal and in response thereto generating an IF representations of each of the received output signals;
    an automatic gain control processing loop for receiving the IF representations of the output signals and in response thereto generating amplitude signals for each output signal;
    first and second peak detector sample-and-hold circuits;
    switch means responsive to the second clock control signal for selectively applying the amplitude signal from said loop null antenna to said first peak detector sample-and-hold circuit and for selectively applying the amplitude signal from the loop ambiguity antenna to said second peak detector sample-and-hold circuits;
    said first and second peak detector sample-and-hold circuits generating and storing peak values of the amplitude signals;
    a comparator for receiving the peak values of the amplitude signals and in response thereto generating a null indication signal;

means for comparing the phase of the output signals from said loop ambiguity antenna and from said omnidirectional antenna and in response thereto generating an ambiguity indication signal when the signal source is located at the front maximum of the loop ambiguity antenna; and means for combining the null indication signal with the ambiguity indication signal and in response thereto generating an output representing the direction of the signal source.

6. The apparatus for deriving the direction of a received signal from a signal source as described in claim 5 further including a phase-locked loop (PLL) frequency synthesizer for generating said reference signal.

7. The apparatus for deriving the direction of a received signal from a signal source as described in claim 6 wherein said means for combining includes a logic gate for receiving the null indication signal and the ambiguity indication signal.

8. The apparatus for deriving the direction of a received signal from a signal source as described in claim 7 wherein said means for combining further includes output means connected to receive the output from said logic gate for providing a visual indication indicating the direction of the received signal from the signal source.

9. The apparatus for deriving the direction of a received signal from a signal source as described in claim 8 wherein said output means is a light emitting diode (LED).

10. The apparatus for deriving the direction of a received signal from a signal source as described in claim 5 wherein said means for comparing the phase signals comprises:

a discriminator circuit for receiving the phase signals and in response thereto generating amplitude signals proportional thereto;

an ambiguity status detector; and switch means responsive to the second clock control signal for selectively connecting the amplitude signals from the discriminator circuit to the ambiguity status detector to thereby generate the ambiguity indication signal.

11. Apparatus for deriving the direction of a received signal from a source, comprising:

a loop null antenna responsive to the received signal and having a signal pattern with two nulls;

a loop ambiguity antenna orthogonally-mounted with respect to said loop null antenna, said loop ambiguity antenna responsive to the received signal and having a signal pattern with front and back maxima;

an omnidirectional antenna mounted adjacent said null and ambiguity loop antenna, said omnidirectional antenna responsive to the received signal;

means connected to said loop antennas and said omnidirectional antenna to generate individual output signals for each of said three antennas;

means for selectively processing the output signals and generating amplitude signals for said loop antennas and for generating phase signals for said loop ambiguity antenna and said omnidirectional antenna;

null signal generation means responsive to the amplitude signals of said two loop antennas for generating a null sense indication when the received signal source position is at a null of said loop null antenna;

an ambiguity status detector responsive to the phase signals of said loop ambiguity antenna and said omnidirectional antenna to generate an ambiguity resolving signal when the source is located at the front maximum of the loop ambiguity antenna; and means for combing the null sense indication and the ambiguity resolving signal and in response thereto generating an output representing the direction of the received signal source with reference to the orthogonally-mounted loop antennas.

* * * * *